United States Patent [19]

Heep et al.

[11] Patent Number: 4,996,709
[45] Date of Patent: Feb. 26, 1991

[54] INTERCOM TELEPHONE

[75] Inventors: Jerry Heep, Weatherford; James Henderson, Fort Worth, both of Tex.

[73] Assignee: Tandy Corporation, Fort Worth, Tex.

[21] Appl. No.: 193,517

[22] Filed: May 12, 1988

[51] Int. Cl.$^5$ .................... H04J 1/14; H04M 11/06
[52] U.S. Cl. .................... 379/160; 379/159; 379/163; 370/69.1; 370/71; 370/30
[58] Field of Search .................... 379/64–66, 379/159, 160, 167, 171–173, 176; 370/69.1, 71, 76, 124, 30

[56] References Cited

U.S. PATENT DOCUMENTS

| | | | |
|---|---|---|---|
| 2,066,332 | 1/1937 | Caruthers | 179/1 |
| 2,137,023 | 11/1938 | Monk | 179/15 |
| 2,276,132 | 3/1942 | Wiessner et al. | 179/2.5 |
| 2,328,450 | 8/1943 | Hagen | 179/15 |
| 2,337,878 | 12/1943 | Espenschied | 179/15 |
| 2,407,238 | 9/1946 | Abraham | 179/15 |
| 2,590,746 | 3/1952 | Adler | 179/15 |
| 2,626,319 | 1/1953 | Cheek | 179/2.5 |
| 2,857,464 | 10/1958 | Singer | 179/15 |
| 2,866,000 | 9/1953 | Caruthers | 179/15 |
| 2,871,293 | 1/1959 | Radcliffe, Jr. | 179/15 |
| 2,917,580 | 12/1959 | Li-Yen Chen | 179/1 |
| 3,304,376 | 2/1967 | Truby | 179/42 |
| 3,577,202 | 5/1971 | Brightman | 179/15 |
| 3,622,710 | 11/1971 | Tothill | 179/84 |
| 3,701,851 | 10/1972 | Starrett | 370/76 |
| 3,705,412 | 12/1972 | Nakamura et al. | 179/37 |
| 3,715,496 | 2/1973 | Jones, Jr. | 178/58 |
| 3,787,640 | 12/1972 | Bush et al. | 179/99 |
| 3,809,815 | 5/1974 | Reed et al. | 179/15 |
| 3,809,816 | 5/1974 | Reed et al. | 179/15 |
| 3,816,662 | 6/1974 | Shaver et al. | 179/2 TV |
| 3,864,521 | 2/1975 | DeLong et al. | 179/2.5 |
| 3,909,552 | 9/1975 | Kerman et al. | 179/99 |
| 4,016,372 | 4/1977 | Hoehn | 179/99 |
| 4,020,289 | 4/1977 | Anderson | 179/15 |
| 4,081,615 | 3/1978 | Hoehn | 179/18 |
| 4,087,639 | 5/1978 | Beene | 179/2.5 |
| 4,092,501 | 5/1978 | Suzuki et al. | 179/99 |
| 4,130,736 | 12/1978 | DeMarco et al. | 179/16 |
| 4,135,063 | 1/1979 | Bosen | 179/99 |
| 4,158,110 | 6/1979 | Ullakko et al. | 179/99 |
| 4,262,171 | 4/1981 | Schneider et al. | 179/18 |
| 4,420,831 | 12/1983 | Hackett | 370/50 |
| 4,449,218 | 5/1984 | Strehl | 370/69.1 |
| 4,475,193 | 10/1984 | Brown | 370/124 |
| 4,479,033 | 10/1984 | Brown et al. | 179/2.51 |
| 4,495,386 | 1/1985 | Brown et al. | 179/2.51 |
| 4,513,413 | 4/1985 | Gorman et al. | 370/30 |
| 4,514,594 | 4/1985 | Brown et al. | 179/2.51 |
| 4,532,307 | 6/1985 | Brown et al. | 370/30 |
| 4,638,124 | 1/1987 | Hargrave et al. | 379/159 |
| 4,644,526 | 2/1987 | Wu | 370/30 |
| 4,646,296 | 2/1987 | Bartholet et al. | 370/124 |
| 4,685,099 | 8/1987 | White et al. | 370/30 |
| 4,691,313 | 1/1985 | Iwata | 370/30 |
| 4,706,244 | 11/1987 | Watson et al. | 370/69 |
| 4,734,932 | 3/1988 | Lott | 379/160 |
| 4,754,476 | 6/1988 | Rasmussen et al. | 375/159 |

FOREIGN PATENT DOCUMENTS

| | | |
|---|---|---|
| 59-52956 | 3/1959 | Japan . |
| 59-178855A | 3/1983 | Japan . |
| 59-095761 | 6/1984 | Japan . |
| 61-152196 | 7/1986 | Japan . |
| 2157919A | 10/1985 | United Kingdom . |

OTHER PUBLICATIONS

K. Smith, *Switcher Lets Voice, Data Share Lines*, Electronics, Jun. 16.

(List continued on next page.)

*Primary Examiner*—James L. Dwyer
*Attorney, Agent, or Firm*—Wolf, Greenfield & Sacks

[57] ABSTRACT

An intercom system for use in combination with a multi-line telephone system wherein the intercom system utilizes the same wire pair for communications between intercom units that is used for normal telephone communications. The intercom system transmits voice signals on two or more frequency modulated channels over a wire pair of a local telephone network. Each intercom unit includes a microprocessor which controls communication activity and protocol in each unit and communicates with other intercom unit miroprocessors via a separate frequency modulated digital signal channel.

27 Claims, 5 Drawing Sheets

OTHER PUBLICATIONS

L. Curran, *How to Turn AC Lines Into Phone Lines*, Electronics, Jul. 20, 1978.

S. Tsuruta and T. Hongo, *Home Media Bus: An Integrated Network for Home Information Systems*, ICCE, Jun. 6, 1984.

von Friedelbopp, *Die Einrichtung zur Anpassung von Außennebenstellen—eine Ergazung fur Reihenanlagen*, Nachrichten, 1969.

I. R. Gjertsen, *Telefonapparater: Utstyr, tilbehor og nye brukermuligheter*, Telektronikk, 1972.

R. A. Broomfield, T. Foxall and P. Beirne, *Making a Data Terminal Out of the Touch-Tone Telephone*, Electronics, Jul. 3, 1980.

Frank Kasparec, *Bilateral Speaker Networks Form Switchless Intercom*, Electronics, Jul.

G. Dash, *Understand FCC Rules When Designing Telecom Equipment*, EDN, May 16, 1985.

Marce Eleccion, *Sensors Tap IC Technology to Add More Functions*, Electronics, Jun. 2, 1986.

Bank Administration Institute, *Systems and Equipment*, Bank Administration, Sep. 1986.

A. Jörgensen & H. Ziegler, *ERICOM 30001—A New Philosophy Within Intercommunication*, Ericsson Review, Nov. 3, 1973.

P. J. Schwartz, *An Integrated Circuit for the Telephone Handset*, Allen Clark Research Centre, The Plessey Company Limited, Caswell, Towcester, Northants, NN12 8EQ England.

R. A. Palma, *Primer on Radio Paging Systems*, Plant Engineering, Apr. 1979.

ACEC Asks for Grant Cutback Tied to Changes, ENR News, May 14, 1981.

G. G. Maks and R. J. Parsons, *Analogue Voice Terminals*, Philips Telecommunication Review, Jun. 1985.

INTERCOM TELEPHONE

FIELD OF THE INVENTION

The invention relates to intercom systems used in conjunction with standard telephone lines. More particularly, the invention relates to multichannel intercom systems implemented over a wire pair of a local telephone network.

BACKGROUND OF THE INVENTION

In the past, multi line telephone products with built-in intercoms have utilized separate sets of wire pairs to implement the telephone communications and the intercom communications, respectively. However, the use of a separate wire pair to implement the intercom communication connections is problematic. Most buildings and houses are equipped with in place wiring for telephone systems only. In order to implement a typical intercom system, the in place wiring of the buildings or houses must be modified. The cost and inconvenience of such modifications can be significant.

It would be advantageous to be able to implement an intercom channel or channels on the same wire pair used for telephone communications. Therefore, it is an object of the present invention to provide an intercom system in which the intercom communication channels are implemented on a local telephone network.

It is a further object of the present invention to provide an intercom system wherein voice signals are transferred between intercom units on a series of frequency modulated channels that are carried on a wire pair of a local telephone network.

It is another object of the present invention to provide an improved method and apparatus for controlling access to the intercom channel or channels.

SUMMARY OF THE INVENTION

The present invention is an intercom system providing multiple channels for communication between a plurality of intercom stations or units. Several voice communication channels are implemented on a single wire pair of a local telephone network by frequency modulating the voice signals to a series of carrier frequencies. The intercom units may be incorporated as part of a telephone set or may be free standing units which are connected in series with a telephone set.

This summary describes the present invention in terms of one possible embodiment having two voice channels and one digital signaling channel. However, it should be understood that any number of voice channels and digital signaling channels can be implemented using the inventive steps disclosed herein. Further, intercom communication can be established in a half-duplex or full-duplex mode.

Each intercom unit is provided with a microprocessor which controls communication protocol as well as other functions and, in the preferred embodiment described herein, three modulator circuits and three demodulator circuits (one pair for each communication channel).

The two modulators for the voice channels are frequency modulators producing different carrier frequencies for the audio voice signals to modulate. The carrier frequencies of the modulators are separated by at least twice the bandwidth of the audio signals so that the data on the two channels do not overlap in frequency. This allows the receiving intercom to separate the voice signals on each channel by a group of frequency filters so that only the voice signals on the channel on which that intercom unit is currently communicating will be demodulated and sent to the telephone speaker. The microprocessor in each unit controls switches to direct incoming signals to the correct filters and demodulators so as to extract the voice signals on the desired frequency channel.

The third channel (digital channel) is also frequency modulated. The digital channel provides a communication path between the microprocessor of each intercom unit so that the microprocessors can control protocol between intercom units. Actual inter-unit signalling protocol may vary and is specific to the particular use contemplated. One particular preferred inter unit signaling protocol is described in the detailed description of the invention.

The invention will be better understood when the detailed description is read in conjunction with the following drawings.

DETAILED DESCRIPTION OF A PREFERRED EMBODIMENT

The intercom system of the present invention comprises a plurality of intercom units connected in communication over a series of frequency modulated channels implemented on a wire pair of a local telephone network. In a preferred embodiment, the intercom circuitry is integrally incorporated within the body of a telephone set such that a single telephone set can be used both as an intercom unit and as a telephone.

Figure 1:
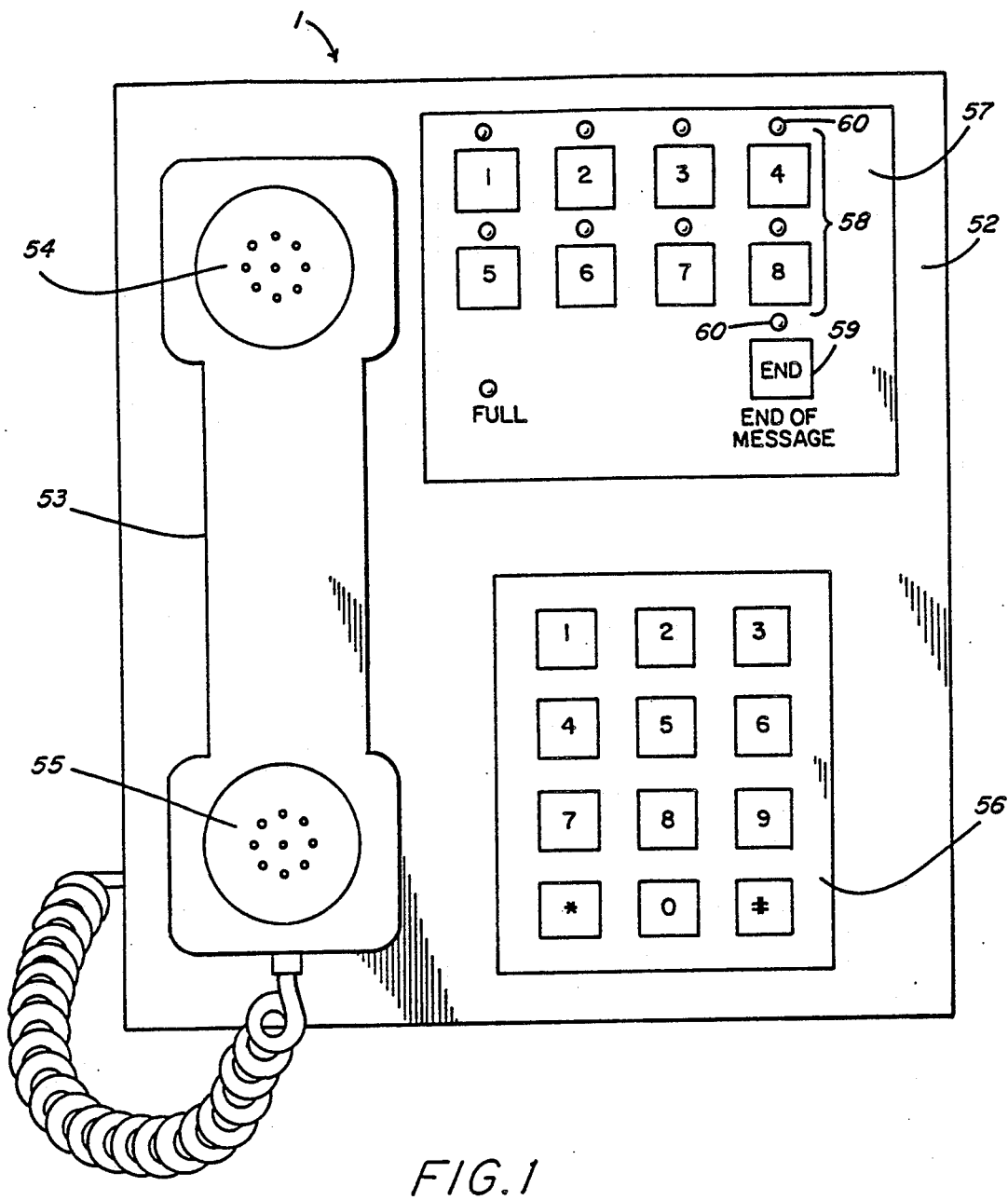
FIG. 1 shows a telephone set embodying the intercom unit of the present invention.
Figure 3A:
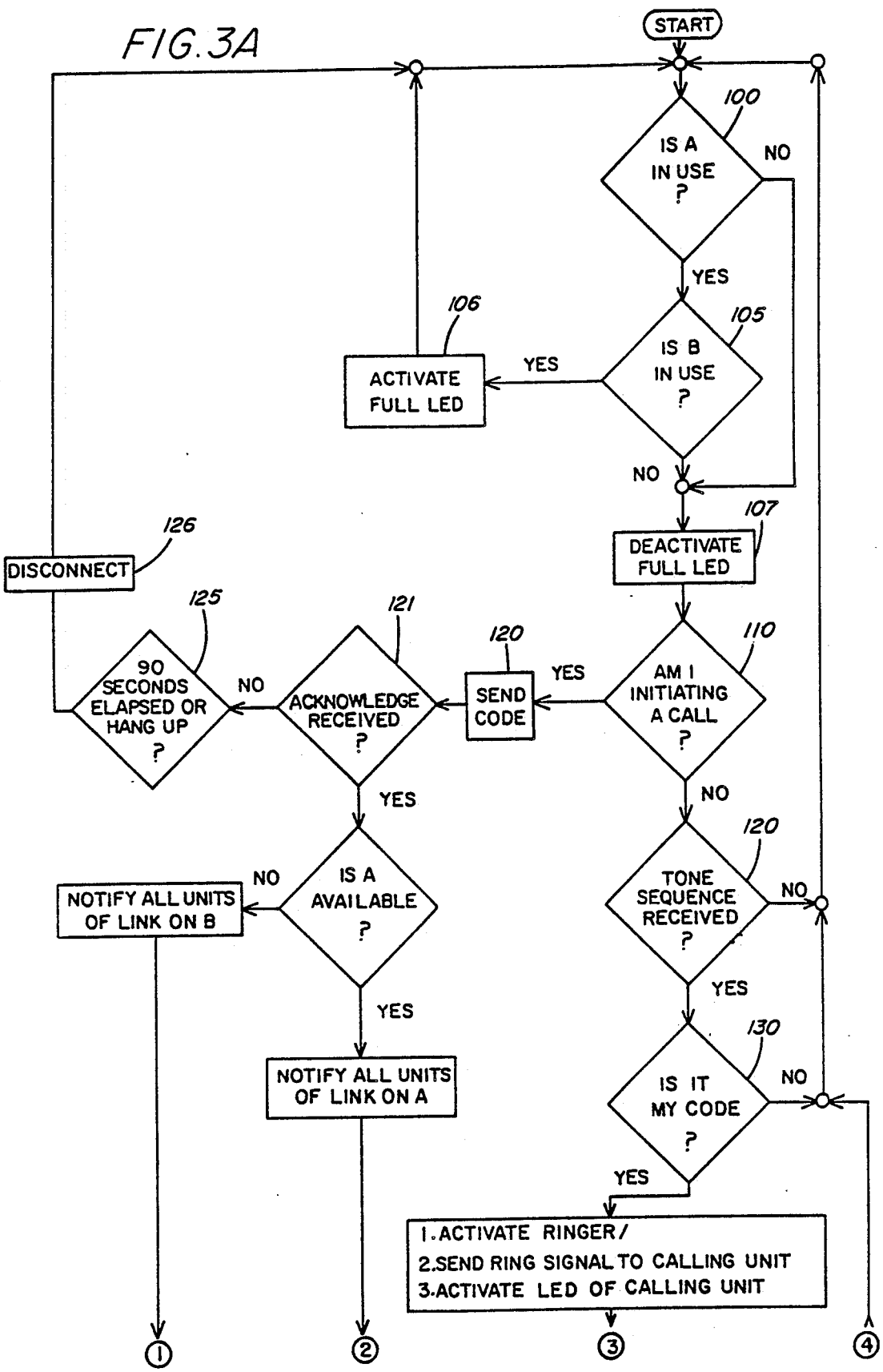
FIG. 3 illustrate a general flow diagram of a preferred implementation of the signaling protocol of the present invention.
Figure 3B:
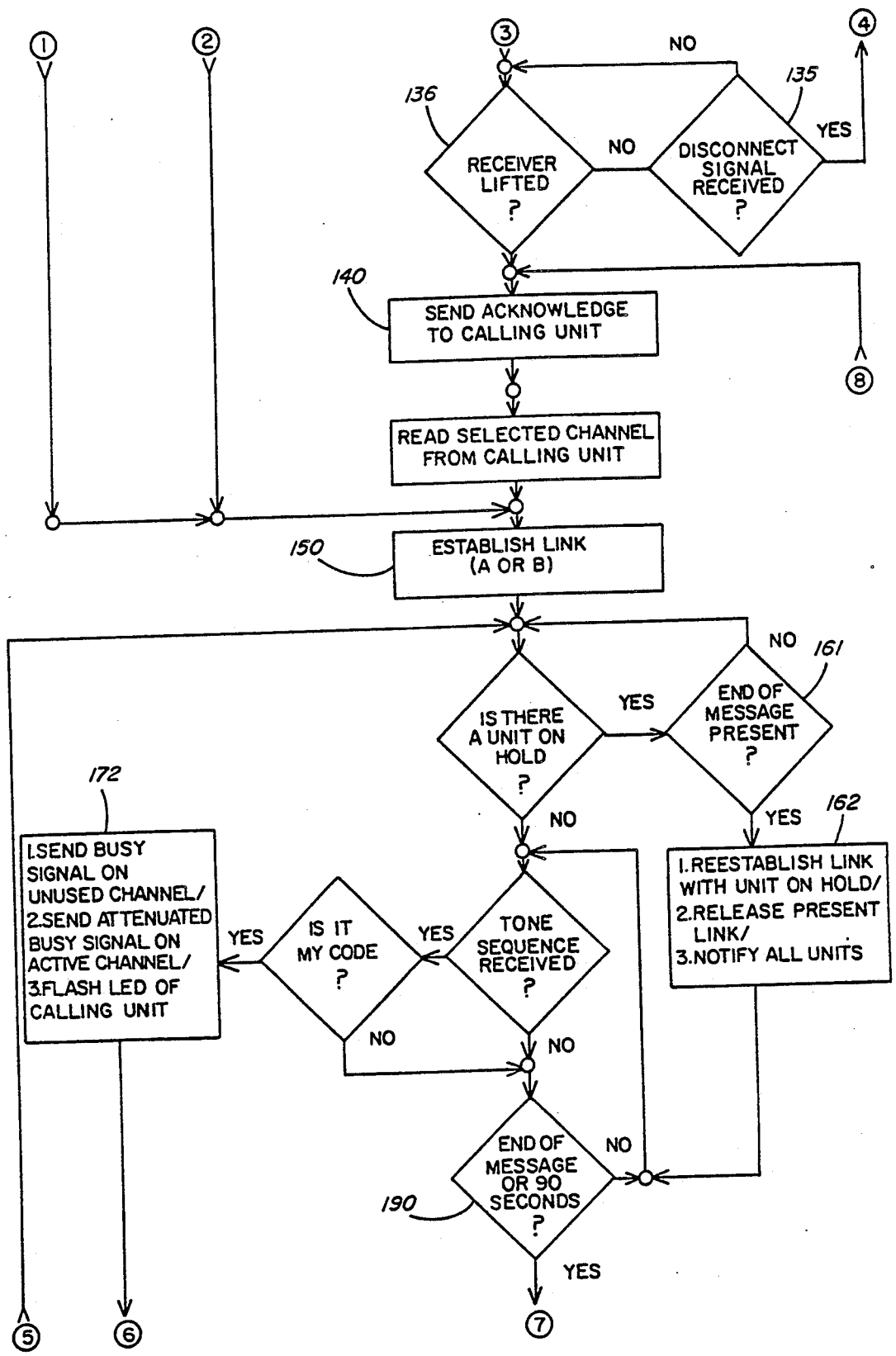

FIG. 1 shows a telephone set having the intercom unit of the present invention integrally embodied therein. The telephone 1 comprises a main body portion 52 and a handset 53 which includes a speaker portion 54 and a microphone portion 55. In addition to the usual keypad 56 that appears on a typical telephone set, the telephone set of the preferred embodiment further contains a keypad 57 having eight address keys 58 and an End of Message Key 59. Each key has an accompanying LED 60. Each address key corresponds to one of eight intercom units on the intercom system. When the telephone is activated by the user lifting the handset from the switch hook, the depression of one of the address keys initiates an intercom call to the addressed unit as described in detail in relation to FIGS. 3A-3B. To terminate an intercom call, the user presses the End of Message Key 9. The End of Message Key may be incorporated directly into the switch hook so that the user need only hang up the telephone in order to end an intercom call.

The telephone further includes a single chip microprocessor, which is typical of dual tone multi frequency (DTMF) telephones. However, the microprocessor implements additional software for controlling the intercom protocol in addition to its telephone communication functions.

Figure 2:
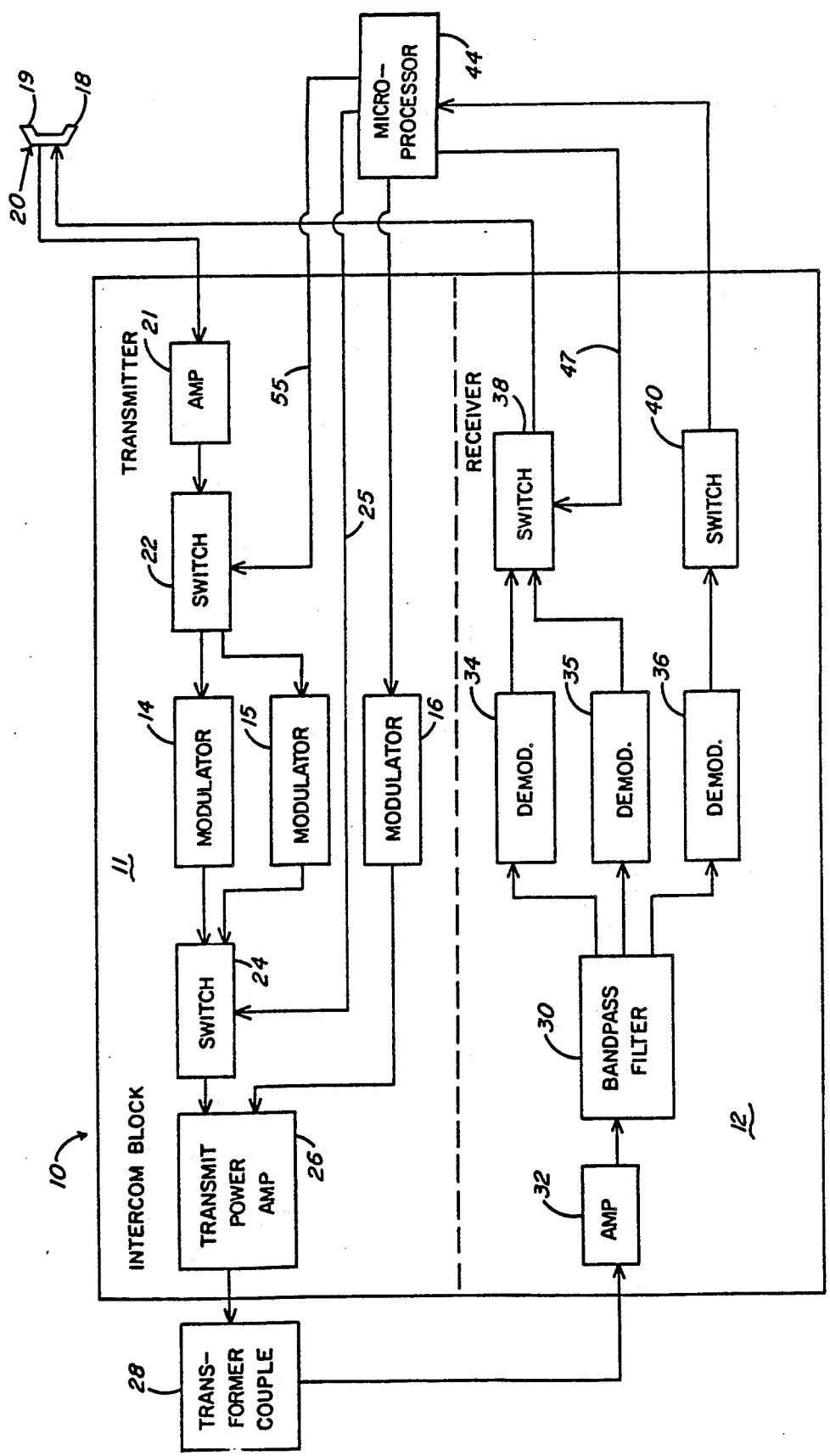
FIG. 2 is a block circuit diagram of the intercom unit of the present invention.

FIG. 2 shows a block diagram of the circuitry within a telephone set which contains the intercom of the present invention. All the circuitry of the intercom of the present invention is contained within intercom block 10 of FIG. 2. The remaining circuitry in FIG. 2 comprises circuitry typically found in a DTMF telephone. The example intercom system shown in FIG. 2 is designed to allow two separate intercom conversations to occur simultaneously on the system. It includes two voice communication channels and one digital signaling communication channel. As stated earlier, however, any number of channels can be implemented using the present invention.

The intercom unit 10 in the preferred embodiment of FIG. 2 comprises a transmitter section 11 and a receiver section 12. The transmitter section 11 comprises three modulators 14, 15 and 16. Modulators 14 and 15 are connected to the microphone 18 of the telephone handset 20 through a switch and amplifier circuit 22. Modulators 14 and 15 are frequency modulators providing different carrier freguencies for the voice signals to modulate. The carrier freguencies of the two modulators 14 and 15 are separated in frequency by preferably at least twice the bandwidth of the voice signals. In a typical telephone system in the United States, the voice channels are band limited to approximately 4kHz. Therefore, the carrier freguencies of modulators 14 and 15 should be separated by at least 8kHz. The switch 22 selectively couples the input of one of the modulators 14 or 15 to the microphone 18 of the telephone via amplifier 21. The switch 22 is controlled by the microprocessor 44 via line 55 to place the voice signals from the telephone speaker on a selected one of the modulators 14 or 15. The frequency modulated output of modulator 14 or 15 is connected to a switch 24 which selects the output of the active modulator and places it at the input of transmit power amplifier 26. The switch 24 is also controlled by the software in the microprocessor 44 and is switched in conjunction with switch 22 so that switches 22 and 24 are always connected to the same modulator. Control signals are fed from the microprocessor 44 to the switch 24 via line 25. Transmit power amplifier 26 amplifies the frequency modulated voice signals and places it at the input of transformer couple 28. Transformer couple 28 places the frequency modulated voice signals onto the telephone wire pair.

The third modulator 16 is also a frequency modulator. This modulator, tuned to a third carrier frequency, has its input connected to the microprocessor 44 and its output connected to the transmitter amplifier 26. Modulator 16 provides a data path for the digital signal channel, allowing the microprocessors of each unit to communicate with each other and control communication protocol.

The receiver section 13 of the intercom unit comprises an amplifier 30, a bandpass filter 32, three demodulator circuits 34, 35 and 36 and two switches 38 and 40. The amplifier 32 has its input coupled to the telephone line via transformer couple 28 and its amplified output signal to bandpass filter circuitry 30. The bandpass filter circuitry 30 comprises three bandpass filters, one for each carrier frequency. Each filter is designed to pass a bandwidth centered around one of the selected carrier freguencies and output a band limited signal to demodulator 34, 35 or 36. Demodulators 34 and 35 correspond to the voice channel carrier freguencies of modulators 14 and 15 respectively while demodulator 36 corresponds to the digital signal channel carrier of modulator 16. Each demodulator strips away the carrier frequency and outputs the baseband voice signal or digital signal. The outputs of the voice channel demodulators 34 and 35 are forwarded to the input of switch 38. Under control of the microprocessor via line 47, switch 38 places the output of one of the modulators 34 or 35 at the input of the speaker 19. The microprocessor 44 includes software that keeps track of which frequency channel the intercom is presently communicating on and controls switches 38 and 40 (as well as switches 22, 24) to direct voice signals to and from the selected modulator and demodulator. The switch 38 sends the selected demodulated baseband signal to the telephone handset speaker 19.

The control signals directed to the microprocessor 44 on the digital signaling channel are demodulated by demodulator 36 and connected to the microprocessor via switch 40.

The modulators, bandpass filters and demodulators are arranged in frequency groups such that modulator 14, demodulator 34 and the input bandpass filter of demodulator 34 are tuned to the same carrier frequency while modulator 15, demodulator 35 and the input bandpass filter of demodulator 35 are tuned to a second carrier frequency, etc.

Intercom addressing is accomplished over the dedicated digital signaling channel. Thus, if one unit initiates an intercom call, it addresses a signaling message to the target unit which will then respond with an acknowledge message. The two units select the voice channel or channels to be utilized and establish the voice communications link on the selected frequency channel. Another pair of units may also communicate in a similar manner, however, they avoid using the frequency channels in use by other units. Thus it is possible to have multiply addressable intercom conversations simultaneously.

The intercom communication scheme can be set up in a half duplex or full duplex mode. In a half duplex system, each communication link between two intercoms requires the dedication of one communication channel. The single communication channel carries the voice signals in both directions, but not simultaneously. In a half duplex system, the receiver of any given unit must be deactivated when the transmitter of the same unit is active in order to avoid receiving its own transmissions. Likewise, the transmitter must be off when the receiver is on. In full duplex, this would not be of concern since the two units would be transmitting on different communication channels. In other words, in a full duplex system, each unit transmits on one frequency and receives on a separate frequency, thereby avoiding any possible interference between transmissions from the two communicating intercoms.

The normal amplitude modulated telephone communication over the telephone wire pair that is used to implement the intercom is unaffected by the implementation of the frequency shifted intercom system channels on that telephone line pair. That wire pair is still capable of establishing a telephone link simultaneously with the intercom links.

When one intercom unit is used to call a second intercom unit, the microcomputers 44 of the calling and called units communicate over the digital signaling channel and select the frequency channel or channels which will be used for the conversation. The microcomputers control inter unit signaling protocol over the digital signaling channel.

The digital signaling communication between microprocessors need not be implemented on a separate communication channel. The digital signaling may be implemented within the voice communication channels by dedicating a specified portion of the bandwidth of the voice communication channels to digital signaling. One possible method of doing this would be to band limit the voice signals into a pass band of 300 Hz to 4 kHz and implement the digital signaling in a baseband range of 0 to 300 Hz. At the transmitting end, the digital signals in the 0 to 300 Hz range and the voice signals in the 300 Hz to 4 kHz range can be combined at the input of the modulators. At the receiving end, the output of the selected demodulator can be split and further filtered to extract the 0 Hz to 300 Hz bandwidth on one line and the 300 Hz to 4 kHz bandwidth on another line. The voice signals would be sent to switch 38 where they would be forwarded to the telephone speaker. The digital signals would be sent directly to the microprocessor.

When transmitting, each intercom unit takes the voice signals spoken into its telephone handset and switches it into the selected modulator via switch 22. The selected modulator 14 or 15 then mixes the voice signal with the carrier freguencies and outputs a frequency modulated signal. The FM signal is then switched into the transmitter amplifier 26 and transformer coupled to the telephone wires. Assuming a half-duplex system, the microprocessor deactivates its receiver circuitry when it is transmitting since the receiver would otherwise detect its own transmissions because of the half-duplex link. Likewise, hen the unit is receiving, the transmitter is disabled and the receiving circuitry enabled.

At the receiving unit, the received signals first pass through the amplifier 32 and bandpass filter circuit 30. The bandpass filter filters out noise as well as signals on the unselected voice channel (on which a separate conversation between two different units might be in progress). The filtered signal is then demodulated by the selected demodulator 34 or 35 and switched onto the telephone speaker by switch 38 where it can be heard by the listener.

Figure 3C:
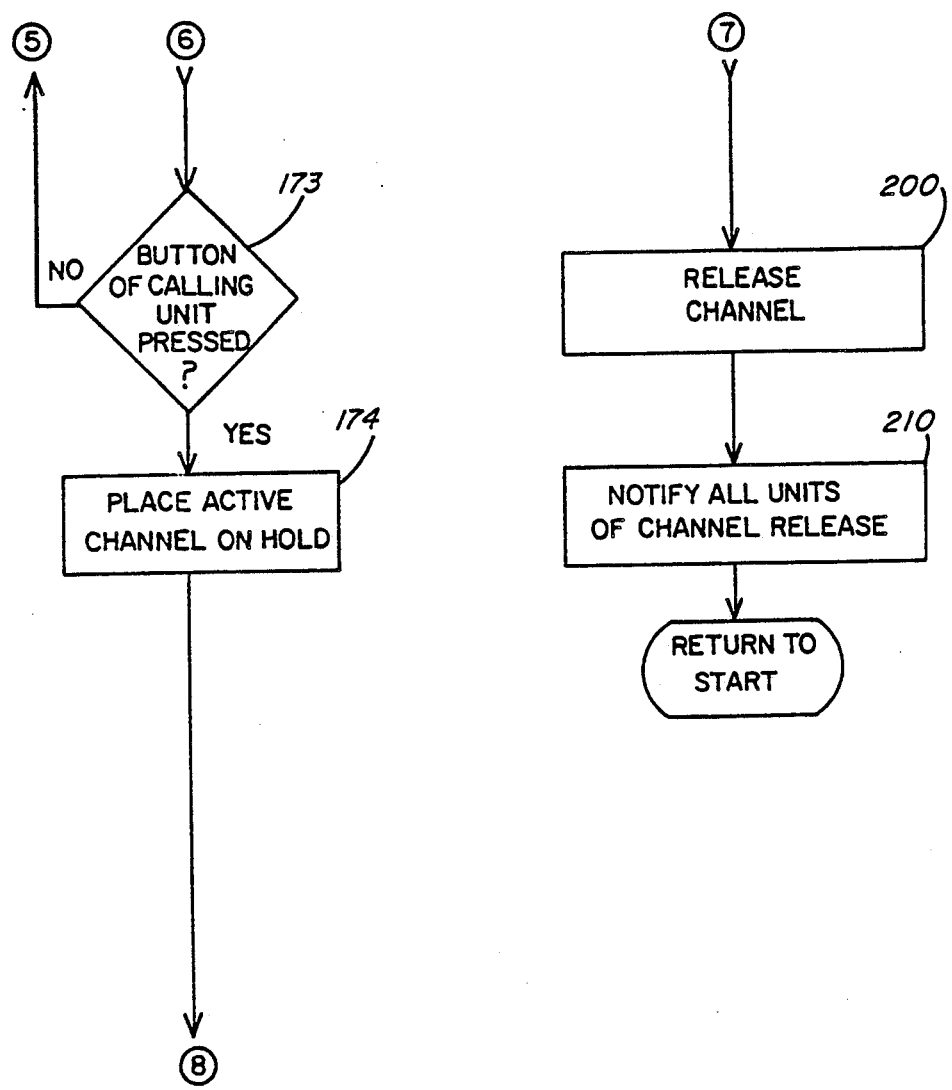

Actual signaling protocol is particular to the application of the intercom system. However, the following discussion describes the software of a preferred signaling protocol for a system having two voice channels (A and B), one digital signaling channel and at least four intercom units (Units 1–4). FIG. 3 shows a flow chart of the software operation of this preferred embodiment. Communications can be arranged in half duplex or full duplex fashion. For purposes of this discussion, we will assume a half-duplex communication system wherein a dialog between users of two intercom units requires the full use of only one of the communication channels. In a half duplex system, since only one communication channel is used for a dialog between two units, only one party may speak at any one time. A unit cannot receive while it is transmitting, or transmit while it is receiving, since the signals would interfere on the single voice channel.

The microprocessor of each unit keeps track of which voice channels are currently in use (steps 100 and 105) and, when all voice channels are in use, activates an LED indicating that all voice channels are in use and disables the unit from initiating a call (step 106). When a caller on one intercom unit activates the unit by lifting the handset and presses the address key of another intercom unit (step 110), a tone-coded data sequence is transmitted over the digital signaling channel to all units on the system (step 120). Anti-collision software may be included in the microprocessor programming to prevent different intercom units from using the digital signaling channel simultaneously and causing interference among signals. Such software is well known in the art and will not be discussed in further detail herein.

Assuming someone lifts the receiver on unit 1 and presses the address key for Unit 3, the microprocessor in Unit 1 sends a data sequence consisting of the unit code of the calling unit, Unit 1, and the unit code of the called unit, Unit 3. Each unit on the system compares the called unit code with its own code (steps 120 and 130). If there is a match (and it is not currently engaged in a conversation), the unit activates its ringer, activates the Unit 1 LED in a blinking mode and sends a ringing signal back to Unit 1 over one of the unused voice channels (step 135). When the user at the called unit, Unit 3, picks up the telephone handset (step 136), the Unit 3 microprocessor sends an acknowledge signal back to Unit 1 over the digital signaling channel and activates the Unit 1 LED in a steady mode (140).

When the calling unit, Unit 1, receives an acknowledge signal from the called unit (step 121), the microprocessor of the calling unit then checks to see if voice channel A is available (step 122). If so, Unit 1 will notify Unit 3 over the digital signaling channel that the communication link is to be effected over voice channel A (step 123).

If channel A is currently in use, the microprocessor of the calling unit will notify the called unit that the units will be linked over voice channel B (step 124). The link is established (step 150) and the two units can then carry on a conversation until disengaged. Whenever the calling unit microprocessor establishes a communication link on a channel (in step 123 or 124), it also notifies the remaining units that that particular channel is in use. As mentioned above, all unit microprocessors keep track of channel use (steps 100 and 105) and, when all channels are in use, activate the FULL LED and disable the unit from initiating a call (step 106).

A voice channel link can be terminated in one of two ways. First, either party can press the End of Message Key when a conversation is finished. The unit will send an End of Message code to the other unit over the digital signaling channel (step 190) and both units will release the voice channel for use by other intercoms (step 200). Second, the channel may be released for use if a 90 second "time out" occurs (shown as an alternative in step 190). Software is provided in the microprocessor and is implemented over the digital signaling channel so that if no transmission is sent over a voice channel for a period of 90 seconds (90 second "time out"), then the channel will be relinquished. The microprocessor in each unit keeps track of the interval between transmissions and resets after each transmission. When a channel is relinquished, either by pressing the End of Message Key or by the lapsing of the 90 second time out, the microprocessor notifies all other units on the system that the particular channel is available once again (step 210). The microprocessors of the other units in the system then cancels the full light and enable the unit to initiate an intercom call (step 107).

If Unit 3 is engaged in a separate communication link with another intercom unit over one of the voice channels when Unit 1 calls, its microprocessor causes a busy signal to be sent to the calling unit on the unused voice channel (step 172). The Unit 3 microprocessor also causes an attenuated busy signal to be heard on the voice channel which Unit 3 is currently engaged on and activates the Unit 1 light in a blinking mode so that the user of Unit 3 can know of the incoming call (step 172). The user of Unit 3 has two options at this point. First, he can ignore the busy signal which will cease when the calling unit hangs up or after 90 seconds (step 125), at which point the microprocessor of the calling unit will automatically terminate the call (step 126, see also step 138). Alternatively, the user on the called unit, Unit 3, may place the current conversation on hold by pressing the address key of the calling unit, Unit 1 (step 173). The microprocessor in Unit 3 automatically places the current conversation in a state of hold (step 174) and acknowledges Unit 1 (step 140). It also causes the LED for the unit on hold to blink. When the conversation between Units 1 and 3 is complete, the user of Unit 3 may then press the address key of the unit on hold to resume that conversation (steps 160, 161 and 162).

Although the foregoing detailed description relates to a single preferred embodiment which employs three communication channels, it should be understood that any number of communication channels ca be implemented over a wire pair of a local telephone network without departing from the inventive steps of the present invention. In addition, the intercom unit can be designed as an integral part of a telephone set or as a free standing unit which can be connected in series with the telephone set. It should also be understood that any number of intercom units can be place in the intercom system and that a full duplex system can also be implemented. The detailed description is intended to be illustrative and not limiting. The invention is limited only by the appended claims.

What is claimed is:

1. An intercom unit for supporting a multiplicity of frequency modulated intercom communication channels over a wire pair of a local telephone network, said intercom unit comprising a transmitter section and a receiver section, said transmitter section comprising;
   a microprocessor,
   microphone means for inputting said baseband audio signals,
   a plurality of frequency modulation means, each modulation means tuned to a different carrier frequency for providing said multiplicity of communication channels,
   first selection means under control of said microprocessor for selecting and coupling one of said modulation means to said microphone,
   first means for coupling said frequency modulated communication channels to said wire pair of a local telephone network,
   means, controlled by said microprocessor, for establishing a digital communication channel, and
   means coupling said digital communication channel to said local telephone network,
   and said receiver section comprising;
   first means for coupling said wire pair of a local telephone network to said receiver,
   frequency filter means connected to said coupling means adapted to separate signals from said wire pair into said multiplicity of frequency modulated communication channels,
   a plurality of frequency demodulation means connected to said frequency filter means for extracting the baseband audio signal from each communication channel,
   speaker means, and
   second selection means coupled between said speaker and said frequency demodulation means for selectively connecting one of said frequency demodulation means to said speaker means, under control of said microprocessor, and
   means for receiving said digital communication channel from said wire pair and for coupling said digital communication channel to said microprocessor.

2. An intercom system as set forth in claim 1 wherein said modulation and demodulation means comprises a multiplicity of modulators and demodulators respectively, said modulators and demodulators arranged in pairs of one modulator and one demodulator, each pair being tuned to a carrier frequency different from every other pair.

3. An intercom system as set forth in claim 2 wherein said first and second selection means comprises electronic switches.

4. An intercom system as set forth in claim 1 further comprising third selection means connected between said frequency modulation means and said first coupling means, said third selection means controlled by said microprocessor to select a carrier frequency in parallel with said second selection means.

5. A method of implementing signaling protocol between a calling intercom unit and a called intercom unit in a multiple intercom system capable of supporting a multiplicity of simultaneous intercom conversations in a half duplex mode, comprising the steps of;
   the calling unit sending, in response to the user of the calling unit initiating a call to the called unit, a digital code to every unit on the system identifying the address of the calling unit and the address of the called unit,
   each unit on the system storing in memory the called unit and calling unit addresses,
   each unit comparing the called unit code with its own code and responding if a match is detected, said response including, if said called unit is currently not engaged in a intercom or telephone communication link, the steps of activating the ringer of the called unit, activating an LED in a blinking mode on said called unit that indicates the identify of the calling unit, and sending a signal to said calling unit indicating that the called unit is ringing, or
   said response including, if said called unit is currently engaged in an intercom or telephone communication link, the steps of sending a signal to said calling unit indicating that the called unit is currently busy, placing a similar but attenuated signal on the channel which the called unit is currently engaged on, and activating an LED that indicates the identify of the calling unit in a blinking mode,
   if a HOLD instruction is received, placing a prior communication link in a HOLD mode so as to answer the calling unit and establish a separate communication link with the calling unit while not terminating the prior link,
   said called unit sending an acknowledge signal to said calling unit in response to a specified input from a user of said called unit,
   one of the calling or called units selecting a currently inactive communication channel for establishing a link between the calling and called unit and notifying all other units on the intercom system of the selected channel, both the calling and called units establishing a communication link over said selected channel,
in response to a TERMINATE instruction from the user of the calling unit or called unit, terminating an intercom conversation, and
automatically terminating an intercom call if no signal is sent over the communication link for a specified amount of time.

6. A method as set forth in claim 5 further comprising the step of automatically reestablishing a link with an intercom that is on hold when the current link is terminated.

7. A method as set forth in claim 5 wherein said instruction from said user comprises the depression of an END OF MESSAGE Key which, when depressed on either intercom unit, terminates the communication link.

8. A method as set forth in claim 5 wherein each unit on the system keeps track of which channels are in use,
each unit activates an LED which indicates that the system is full when all channels are in use, and
when a communication link on a specific channel is terminated, one of the calling or called units notifies all units on the intercom system that the link on said specific channel has been terminated.

9. An intercom unit for supporting intercom communication channels on a telephone network line, said intercom unit having a microphone for accepting input audio signals, a speaker for outputting audio signals and a microprocessor for producing digital communication protocol signals;
means for combining said digital communication protocol signals with said audio signals to produce a baseband signal having said digital communication protocol signals in a first frequency range and said audio signals in a second frequency range,
modulation means responsive to said baseband signal for frequency modulating said baseband signal to one of a plurality of transmission frequencies,
first coupling means for placing said frequency modulated signal on said telephone network line to produce said intercom communication channels
second coupling means for receiving said intercom communication channels containing said frequency modulated signals from said telephone network line,
demodulation means, coupled from said coupling means, for demodulating said frequency modulated signals to produce said baseband signals,
means for frequency separating said baseband signals into said digital communication protocol signal and said audio signal.

10. An intercom unit as set forth in claim 9 wherein said intercom unit is integral with a telephone set.

11. An intercom unit as set forth in claim 10 wherein said first and second coupling means comprise a transformer couple.

12. An intercom unit as set forth in claim 11 wherein said intercom communication channels are established in a half duplex mode.

13. An intercom unit as set forth in claim 11 wherein said modulation and demodulation means comprise a plurality of modulators and a plurality of demodulators arranged in pairs comprising a modulator and a demodulator or tuned to a specified frequency, each pair being tuned to a different frequency.

14. An intercom system as set forth in claim 13 wherein said microprocessor monitors the use of said intercom communication channels and, when an intercom communication channel is to be established with another intercom unit, selects a modulator which is tuned to a frequency with is not currently in use.

15. An intercom unit as set forth in claim 14 wherein said microprocessor monitors said intercom communication channels to determine if another unit is attempting to establish an intercom communication link with said intercom unit and the channel on which said link is to be established, and selects the demodulator tuned to the frequency comprising said channel over which said link is to be established.

16. An intercom system as set forth in claim 11 wherein voice communication is established over said voice communication channels in a full duplex mode.

17. An intercom system as set forth in claim 9 wherein said means for combining said digital communication protocol signals with said audio signals comprises,
first frequency bandpass filter means for limiting said audio signals to a specified band, and
second frequency bandpass filter means for limiting said digital communication protocol signals to a second frequency band.

18. An intercom unit as set forth in claim 9 wherein said means for frequency separating comprises,
first and second bandpass filter means, coupled in parallel, said first bandpass filter means extracting said audio signals and said second bandpass filter means extracting said digital communication protocol signals.

19. An intercom unit for supporting a multiplicity of frequency modulated intercom voice communication channels over a wire pair of a local telephone network, said intercom unit comprising a transmitter section and a receiver section, said transmitter section comprising;
processor means, including means for establishing digital communication protocol signals,
microphone means for inputting baseband audio signals,
a plurality of frequency modulation means, each modulation means tuned to a different carrier frequency for providing said multiplicity of communication channels,
selection means under control of said processor means for selecting and coupling one of said modulation means to said microphone,
means for coupling said frequency modulated communication channels to said local telephone network,
means controlled from said processor means for establishing a digital communication channel,
and means coupling said digital communication channel to said local telephone network.

20. An intercom unit as set forth in claim 19 wherein said means for establishing a digital communication channel comprises a modulator.

21. An intercom unit for supporting a multiplicity of frequency modulated intercom voice communication channels over a local telephone network, said intercom unit comprising a transmitter section and a receiver section said receiver section comprising;
processor means, including means for assimilating digital communication protocol signals received by said receiver section, means for coupling a wire pair of a local telephone network upon which wire pair a multiplicity of frequency modulated communication channels are established, including a digital communication protocol channel, a plurality of frequency demodulation means, coupled to said processor means for extracting the baseband audio signal and the digital communication protocol signal from each communication channel, speaker means, selection means coupled between said speaker and said demodulation means for selectively connecting one of said frequency demodulation means to said speaker means, under control of said processor means, and means coupled between said demodulation means and said processor means for coupling the demodulated digital communication channel to said processor means.

22. A method of implementing signaling protocol in a multiple intercom system capable of supporting intercom conversations, said method comprising the steps of;

combining input voice signals with digital protocol signals to produce baseband signals having said digital communication protocol signals in a first frequency range and said input voice signals in a second frequency range, establishing multiple intercom communication channels by modulating multiple modulation signals by the baseband signals.

23. A method as set forth in claim 22 further including the steps of separately demodulating the signal from the local telephone network into separate voice and digital protocol signals.

24. A method as set forth in claim 23 including providing a speaker means and coupling the demodulated voice signals to the speaker means while the demodulated digital protocol signal is coupled to the processor means.

25. An intercom unit for supporting intercom communication channels on a telephone network line, said intercom unit comprising, a microphone for accepting input audio signals, a speaker for outputting audio signals, a processor means for establishing digital communication protocol signals, means for combining said input audio signals with said digital communication protocol signals to establish a baseband signal having said digital communication protocol signals in a first frequency range of said baseband signal and said audio signals in a second frequency range of said baseband signal, modulator means for modulating said baseband signals to one of a plurality of transmission frequencies, means for coupling said frequency modulated signals to the local telephone network.

26. An intercom unit as set forth in claim 25 further including demodulation means establishing separate receive voice and digital communication channels and coupled from said local telephone network.

27. An intercom unit as set forth in claim 26 including means for coupling demodulated voice channels to the speaker and means for coupling the digital signal channel to the processor means.

* * * * *